Dec. 15, 1959  J. H. BREISCH ET AL  2,916,972
CONTOUR MILLING MACHINE
Filed July 18, 1957  6 Sheets-Sheet 1

INVENTORS
JOHN H. BREISCH
& JOHN R. HUMPHREY.
BY
RICHEY, WATTS, EDGERTON,
McNENNY & FARRINGTON.
ATTORNEYS.

Dec. 15, 1959  J. H. BREISCH ET AL  2,916,972
CONTOUR MILLING MACHINE
Filed July 18, 1957  6 Sheets-Sheet 2

INVENTORS
JOHN H. BREISCH
& JOHN R. HUMPHREY.
BY
RICHEY, WATTS, EDGERTON,
MCNENNY & FARRINGTON.
ATTORNEYS

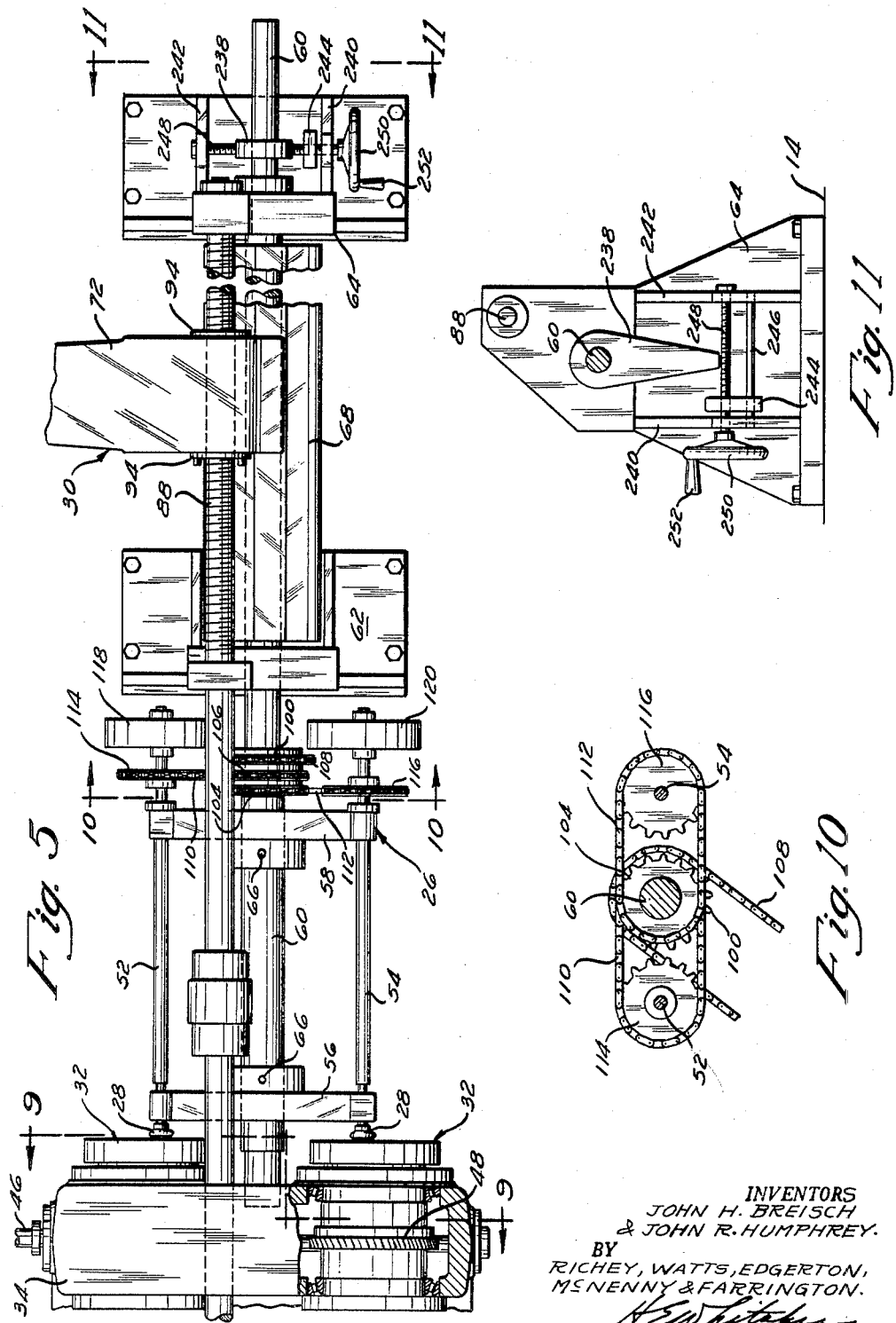

Dec. 15, 1959 J. H. BREISCH ET AL 2,916,972
CONTOUR MILLING MACHINE
Filed July 18, 1957 6 Sheets-Sheet 5

INVENTORS
JOHN H. BREISCH
& JOHN R. HUMPHREY.
BY
RICHEY, WATTS, EDGERTON,
McNENNY & FARRINGTON.
ATTORNEYS

United States Patent Office 2,916,972
Patented Dec. 15, 1959

2,916,972

CONTOUR MILLING MACHINE

John H. Breisch, Cleveland, and John R. Humphrey, Mentor, Ohio, assignors, by direct and mesne assignments, to Turbo Industries, Inc., Cleveland, Ohio Application July 18, 1957, Serial No. 672,591

10 Claims. (Cl. 90—13.7)

This invention relates to a material forming apparatus and more particularly to a machine operable to cut gas turbine blades and valves having a surface contour with a two-dimensional curvature from pieces of raw stock material, or rough forgings and castings.

Broadly stated, this invention comprehends the provision of a blade template having a shape and contour similar to that of a desired blade and preferably being some multiple in size of the desired blade, machine apparatus for uniformly longitudinally moving and rotating a stock piece while simultaneously rotating the template and moving a cutter transversely relative to the stock piece in accordance with the transverse position of a follower engaging the template, the follower being moved longitudinally relative thereto at a speed equal to the multiple of length of the template relative to the length of the desired blade. Accordingly, simultaneous relative movement between the stock piece and cutter in both longitudinal and transverse directions is effected in accordance with the shape and contour of the template whereby the blade is cut to a shape and contour similar to that of the template.

Production of blades by apparatus and methods for casting and forging metal in various manners have been known and utilized heretofore with a considerable degree of success. However, blades produced in accordance with such procedures are subject to cracking and imperfections along edges and root areas whereby a high percentage of scrap is produced in accordance with these methods. In addition, relatively complicated and costly machinery and apparatus for performing a succession of time-consuming steps is required for producing blades by the mentioned procedures and costly precautions in many cases must be taken to overcome hazards deleterious to health of human operators of such apparatus.

According to a prior invention of applicants herein as disclosed in patent application Serial No. 623,840, filed November 23, 1956, stock pieces provisionally formed as blades may be ground to finished shape and contour by disposing the same relative to a moving abrasive belt grinder. According to this mentioned invention, blade making has been greatly improved in that the same can be made with great accuracy, at low cost and at a relatively high rate. According to the present invention, even further advantages over the mentioned prior invention arise whereby the production of blades of desired finished shape and contour from raw stock material is facilitated in a single operation.

In accordance with the features of this invention, the aforementioned objections are avoided and blades are produced with a low percentage of scrap at a greatly reduced cost. Subsequent to the formation of blades in accordance with procedures herein described, a simple finishing and polishing operation is performed to complete the blade.

Therefore, it is an object of this invention to provide a blade cutting machine apparatus that is relatively inexpensive and effective for simply and quickly cutting blades having a compound surface contour.

It is another object of this invention to provide a blade cutting machine apparatus effective for cutting blades from stock pieces in accordance with the surface contour of a blade template.

It is another object of this invention to provide a blade cutting machine apparatus according to the last preceding object providing longitudinal movement of a stock piece relative to a cutter and proportional longitudinal movement of a follower relative to and in engagement with the template for positioning the cutter transversely relative to the stock piece.

It is another object of this invention for providing a milling machine for forming double-curvature surfaces on a work piece, wherein the milling cutter head is integral with a follower which engages directly a template which is some multiple in size of the finished work piece.

It is another object of this invention for providing means to advance a stock piece relative to a cutter at a predetermined speed and means for retracting the stock piece advance mechanism at a speed many times the mentioned predetermined speed.

It is anothr object of this invention for providing improved mechanism to move a cutter transversely relative to a stock piece in accordance with the longitudinal position of a follower engageable with a blade template and in accordance with the rotary position of the blade template.

It is another object of this invention to provide a blade cutting apparatus having gripping means to restrain a stock piece from lateral movement while the same is moved longitudinally relative thereto and cutter means disposed adjacent to the gripping means for cutting the stock pieces to shape.

Other and further objects and advantages will become apparent from a more detailed description of the invention taken with the accompanying drawings in which:

Fig. 5 is a detail view, partially in section, showing portions of the stock piece mounting and rotating apparatus and cutter mounting, rotating and pivoting apparatus;

Fig. 10 is a sectional view of a portion of the cutter drive mechanism of the invention, taken along section 10—10 of Fig. 5;

Fig. 11 is a sectional end view of the template follower lift and control mechanism of the invention, taken along section 11—11 of Fig. 5.

Figure 1:
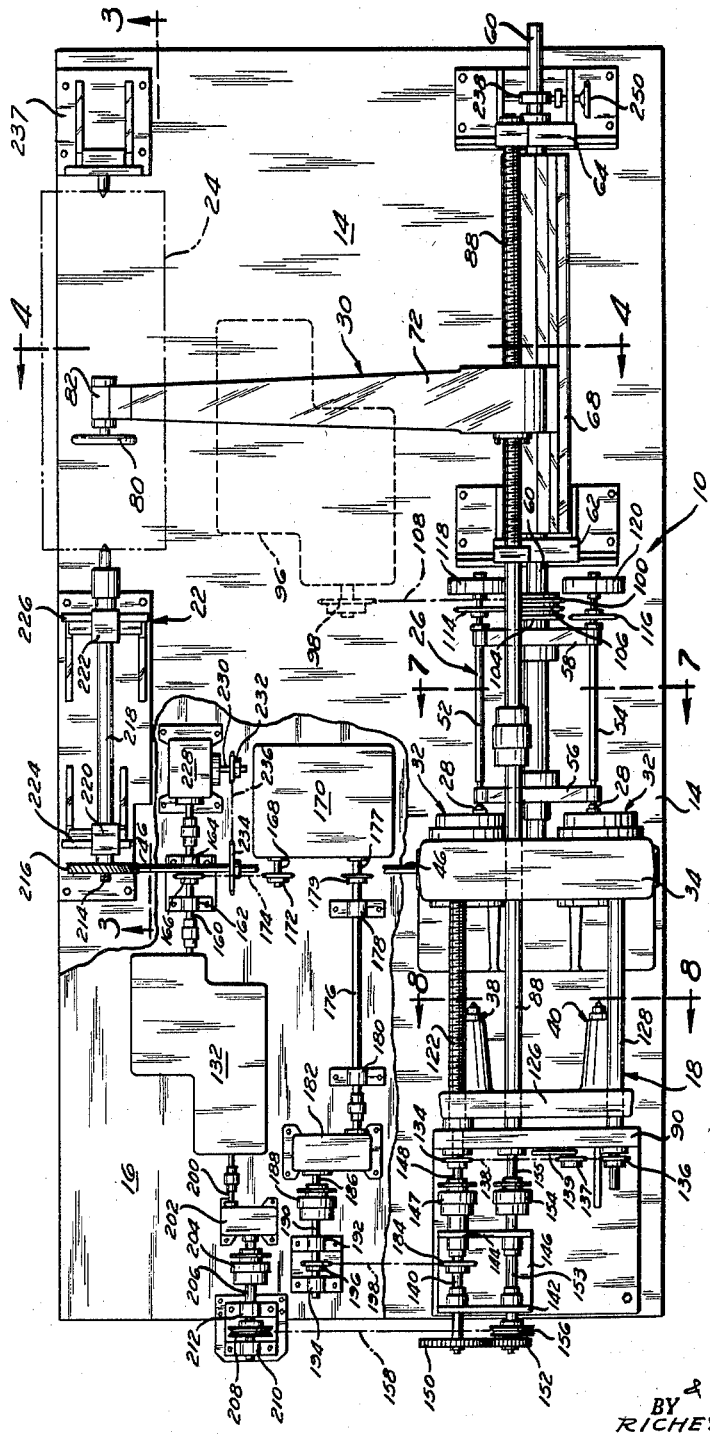
Fig. 1 is a plan view of a machine according to the invention with parts cut away to illustrate apparatus at a different level.

In accordance with an embodiment of the invention as shown in the drawings, a blade cutting machine 10 is mounted on a frame 12 having an upper table 14 and a lower table 16 for mounting the various components of the machine. Machine 10 includes a stock piece mounting and advancing assembly shown generally at 18 for receiving and appropriately positioning the stock pieces 20 for cutting blades to form, a mounting and rotating assembly 22 for positioning a template 24, a cutter mounting, rotating and pivoting assembly 26 responsive to the position of template 24 to position cutters 28 to cut away stock pieces 20 to form blades and further apparatus including motors, belt and chain drives for advancing and rotating the stock pieces 20 in timed relation and proportionately to the rotation of template 24 and to the advancement of a template follower 30.

Figure 9:
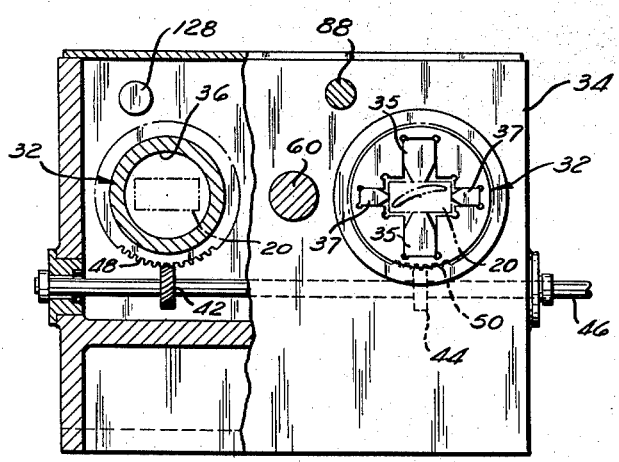
Fig. 9 is a sectional view, partially broken away, of the stock piece mounting and rotating assembly of the invention, taken along section 9—9 of Fig. 5.

Stock pieces 20 are longitudinally advanced through suitable chucks 32 (see Fig. 9) gripping the respective pieces sufficiently to prevent any motion except longitudinal motion of the pieces with respect to the chucks but grippting the same sufficiently loosely so as to permit such relative longitudinal motion. The respective chucks 32 are mounted in a housing 34 on upper plate 14 for rotation on parallel center lines. Each chuck has a longitudinal opening 36 extending therethrough to receive the stock pieces, pairs of opposed jaws 35 and 37 engageable with the stock pieces and respective pushers 38 and 40 for advancing the stock pieces in an orderly timed manner as more clearly explained hereinbelow. Additionally, the chucks are rotationally positioned by respective helical gears 42 and 44 driven by a shaft 46 and engaging respective complementary helical gears 48 and 50 integral with respective chucks. Shaft 46 is driven in timed relation to the stock advance feed and with other components as hereinafter described. As each stock piece is advanced to the right as seen in Fig. 1 of the drawings, and as it is rotated as hereinabove explained, the same encounters one of the two cutters 28 which is also positioned relative to the stock piece under the influence of follower 30 and cooperative linkage, to machine or cut off portions of the stock piece to produce a blade.

Figure 4:
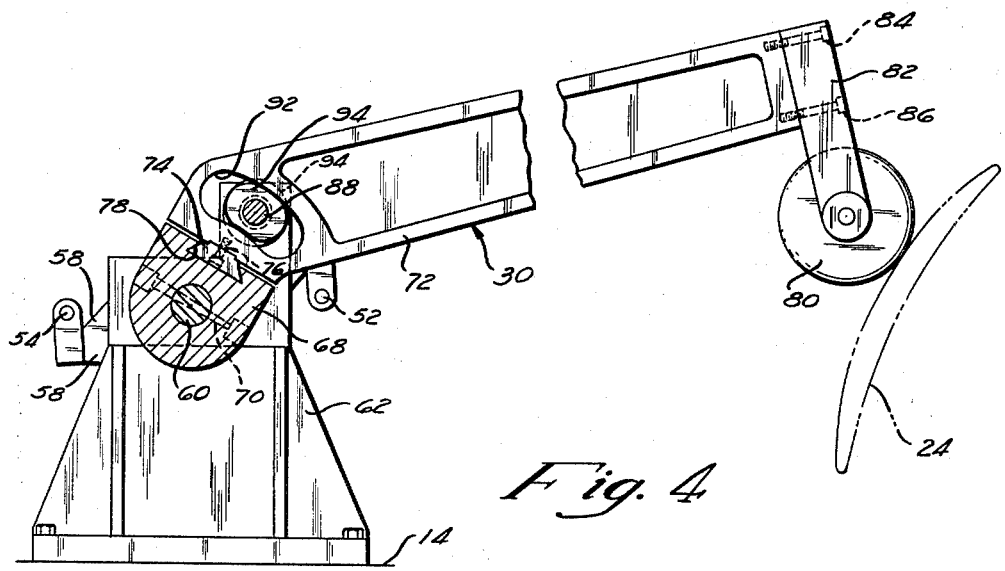
Fig. 4 is a detail view of a follower and mounting apparatus for positioning of blade cutters in accordance with the template surface.
Figure 7:
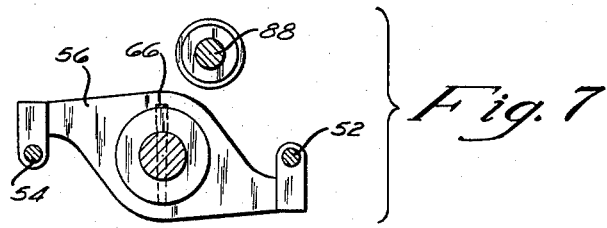
Fig. 7 is a sectional view of a portion of the cutter mounting assembly taken along section 7—7 of Fig. 1.

Cutters 28 are preferably mounted on the end of shafts 52 and 54 which are supported for rotation in suitable bearings in a pair of spaced yokes 56 and 58, each being fixedly, centrally mounted on a template follower shaft 60 supported for rotation at one end in housing 34, at a point intermediate its length in a pedestal 62 and at its other end in a pedestal 64. As seen clearly in Fig. 7 of the drawings, each yoke 56 and 58 is secured to shaft 60 by a peg 66 extending transversely through the yoke and shaft in holes appropriately provided. Also fixedly secured to shaft 60 is a bipartite template follower shown most clearly in Fig. 4 of the drawings and comprising a first elongated part 68 surrounding and fixedly secured to a reduced portion of shaft 60 by a transverse peg 70 and a second elongated arm part 72 secured to the first part by a tongue 74 bolted to the second part 72 at 76 and slidably received in a groove 78 in first part 68. A template follower wheel 80 for engaging template 24 and for pivoting arm 72 in response to rotation of template 24 is journaled in an end of fork 82 which is secured to the end of arm 72 by a pair of bolts 84 and 86. Pivotal motion of arm 72 is effective to impart an equal angular pivotal motion to shaft 60, yokes 56 and 58 and cutters 28.

Roller 80 together with arm 72 is movable longitudinally along template 24 by a shaft 88 threaded along a portion to provide a screw having a right hand thread and extending between pedestals 62 and 64 mounted on table 14. Arm 72 receives screw 88 in a slotted portion 92 which also receives a nut 94 fixedly secured against lateral movement in the slot. Nut 94 threadedly engages screw 88 whereby rotation of screw 88 imparts a longitudinal motion to the arm assembly including tongue 74 slidable along groove 78. It is observed that pivotal motion of arm 72 with respect to screw 88 is permitted by slot 92 in arm 72 and that rotation of the screw and a simultaneous rotation of template 24 is effective to permit roller 80 to be translated and to roll over and scan the entire surface of the template.

For machining or cutting away portions of stock pieces 20, cutters 28 are continuously rotatable by a motor 96 mounted on lower table 16 and coupled to shafts 52 and 54 through a drive including a driving sprocket 98 mounted on the motor output shaft, a driven sprocket 100, rotatably mounted about and freely rotatable relative to a portion of shaft 60 extending between housing 34 and pedestal 62. As shown more clearly in Figs. 1 and 5, sprocket 100 is directly coupled to a pair of further sprockets 104 and 106 preferably equal in size and number of teeth, also mounted about and freely rotatable relative to shaft 60 and a driven chain 108 around and engaging sprockets 98 and 100 effects driving rotation of the sprockets 100, 104 and 106. A chain 110 engaging sprocket 106 and a sprocket 114 fixedly rotatable with shaft 52 and a chain 112 engaging sprocket 104 and a sprocket 116 rotatable with shaft 54 are provided for imparting rotation to the cutters 28. Accordingly, in any angular position of yokes 56 and 58 and therefore also cutters 28, the cutters are driven by motor 96 through the chain and sprocket drive just described since sprockets 114 and 116 are maintained at a constant radius from shaft 60. For effecting a relatively continuous and even rotary motion of cutters 28, fly wheels 118 and 120 are rigidly connected to the ends of shafts 52 and 54 remote from the cutters 28.

Figure 2:
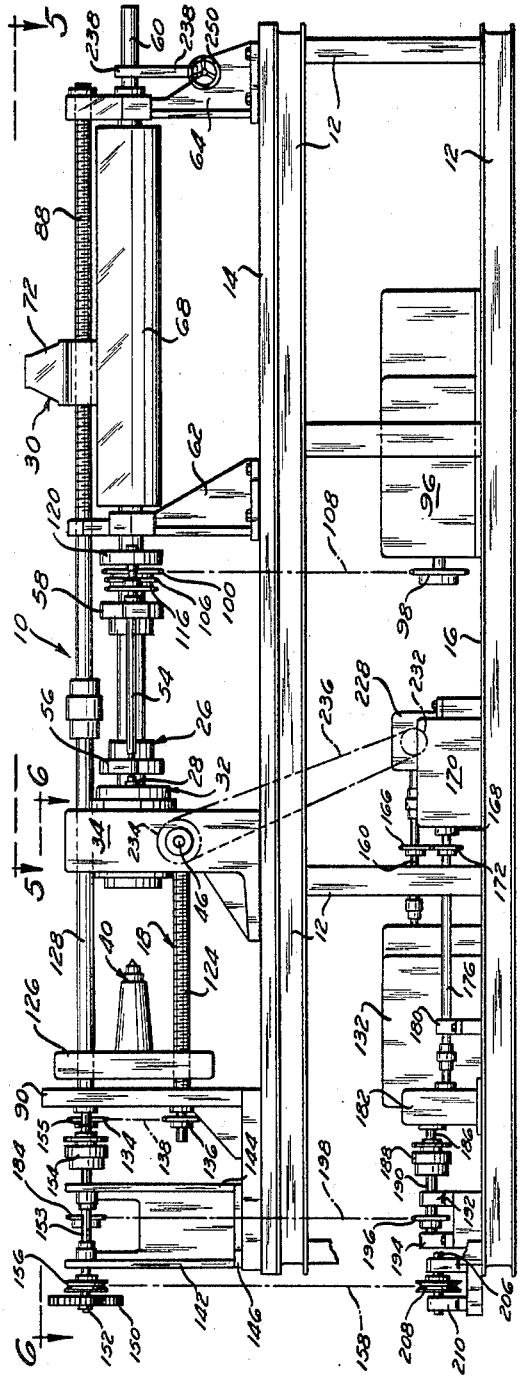
Fig. 2 is a side view of the machine shown in Fig. 1.
Figure 3:
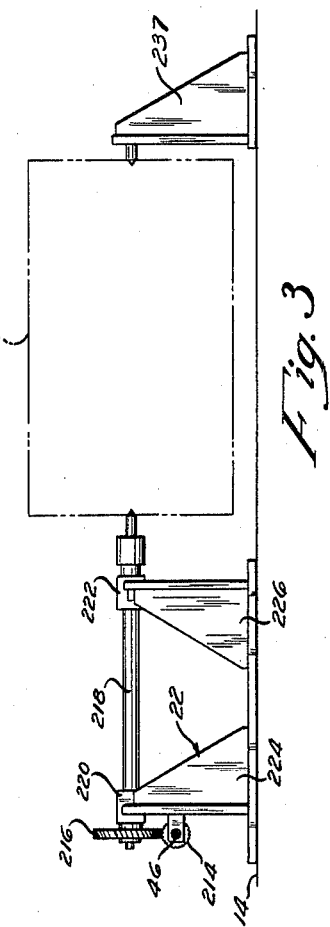
Fig. 3 is a detail side view of a blade template mounting and rotating device.
Figure 8:
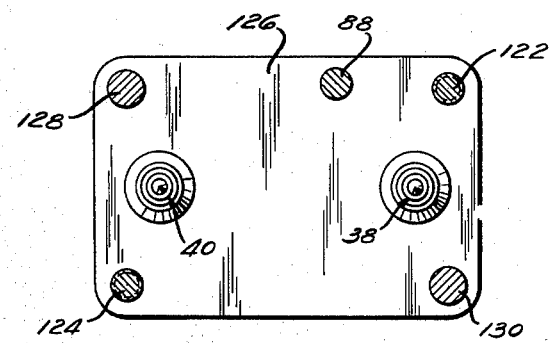
Fig. 8 is a sectional view of a portion of the stock advancing assembly of the invention, taken along section 8—8 of Fig. 1.

Advancement of stock pieces 20 toward the cutters 28 by pushers 38 and 40 is effected by a pair of right hand threaded screws 122 and 124 extending between pedestal 90 and housing 34 and mounted for rotation therein. Screw 122 is shown clearly in Figs. 1, 6 and 8 and screw 124 is shown clearly in Figs. 2 and 8. Screws 122 and 124 threadedly engage a yoke 126, and pushers 38 and 40 are preferably integrally mounted on yoke 126 whereby rotation of the screws is effective to translate the yoke and pushers longitudinally. Yoke 126 is guided in its longitudinal travel by a first guide shaft 128 shown in Figs. 1, 6 and 8 and a shaft 130 shown in Fig. 8 extending parallel to shaft 128 between pedestal 90 and housing 34. As clearly seen in Fig. 8 of the drawings, yoke 126 is preferably rectangular in shape and screws 122 and 124 are diagonally disposed near corners of the yoke and each of the guide shafts 128 and 130 are also diagonally disposed at other corners of the yoke whereby wedging or cocking of the yoke in its longitudinal movement is avoided.

Figure 6:
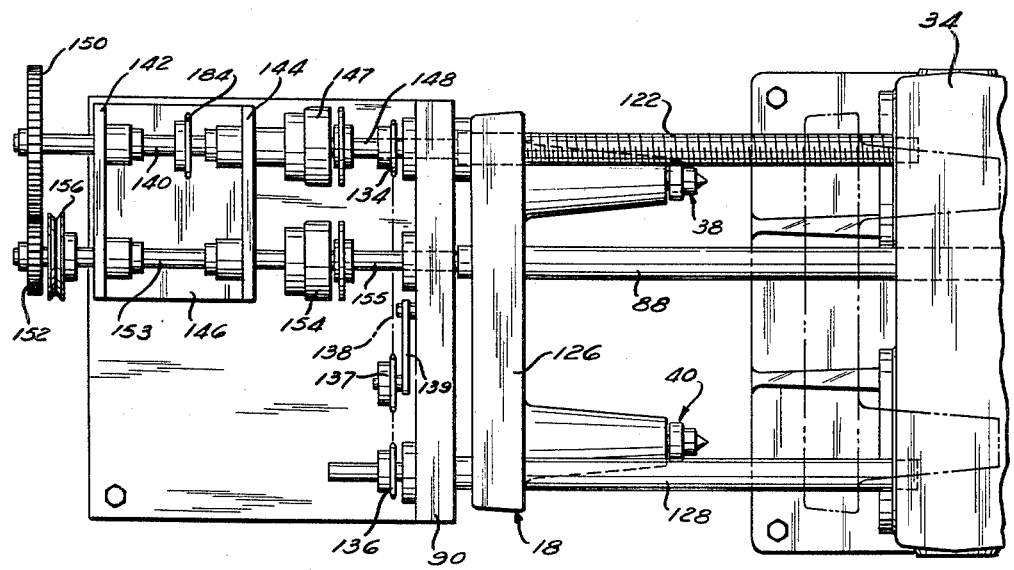
Fig. 6 is a detail plan view showing the stock piece advancing apparatus.

Screws 122 and 124 extend through the upright portion of pedestal 90 and have respective sprockets 134 and 136 of equal size and numbers of teeth mounted on portions of the screws protruding through the pedestal and a chain 138 shown schematically in Figs. 1 and 6 is provided for driving engagement between these sprockets. An idler sprocket 137 mounted on an arm 139 pivotal in pedestal 90 engages chain 138 to tighten the same and eliminate slack therein.

A shaft 140 is mounted for rotation between a pair of upright portions 142 and 144 of a pedestal 146 mounted on table 14 and is in driving engagement with sprocket 134 through a clutch 147 and a short extension 148 of screw 122. Shaft 140 is also provided with a spur gear 150 on an end extending through upright portion 142 and gear 150 is engageable with another spur gear 152 mounted on a shaft 153 also extending between upright portions 142 and 144 and being selectively in driving engagement with screw 88 through a clutch 154 and an extension 155 of screw 88. It is observed that in one condition of operation, yoke 126 and pushers 38 and 40 may be advanced to advance the stock pieces 20 by drive through shaft 140, clutch 147, and sprockets 134 and 136, and simultaneously template follower 30 may be advanced by the rotation of shaft 140, the engagement of gears 150 and 152, rotation of shaft 155 and screw 88 through clutch 154. In another condition of operation hereinafter described in detail, screws 88, 122 and 124 are rotatable in a reverse direction by driving shaft 153 through a pulley 156 mounted on the extension of shaft 153 and a driven belt 158 while disengaging other driving influence from shaft 140.

Rotation of shaft 140 is effected by a reversible motor 132 mounted on lower table 16 and driving a shaft 160 journaled in bearings 162 and 164 and having a sprocket 166 rotatable therewith. The input shaft 168 of a reduction gear box 170 is provided with a sprocket 172 equal in size and number of teeth to sprocket 166 and in driven engagement therewith through a chain 174 and a shaft 176 journaled in bearings 178 and 180 is coupled to an output shaft 177 of gear box 170 which provides the input to a further reduction gear box 182. A sprocket 184 fixed to shaft 140 is driven by an output shaft 186 of gear box 182 through a clutch 188, a shaft 190 journaled in bearings 192 and 194, and by a sprocket 196 mounted thereon and in driving engagement with sprocket 184 through a chain 198.

Motor 132 is preferably of a variable speed reversible type wherein motor output shaft 160 may be driven over a rather wide range of speeds. In one embodiment of the invention, motor 132 comprises a reversible, one-horsepower variable drive motor wherein the output shaft 160 is rotatable at any speed in a range between 278 r.p.m. and 1980 r.p.m., and reduction gear box 170 provides a speed reduction of 10:1 and reduction gear box 188 provides a speed reduction of 900:1. Accordingly, for the range of output speeds of motor 132 the range of output speeds of gear box 170 is from 108.2 to 1082 r.p.m. since sprockets 166 and 172 are of the same size and number of teeth, and the range of speeds of shaft 186 from the output of gear box 182 is .12 r.p.m. to 1.2 r.p.m. Since sprockets 184 and 196 are of equal size and number of teeth, and since sprockets 184 and 196 are of the same size and number of teeth, screws 122 and 124 have a range of speed from .12 r.p.m. to 1.2 r.p.m. when driven by the output shaft of gear box 182. In the mentioned one embodiment of this invention, gears 150 and 152 are in the ratio of 2:1, whereby screw 88 is advanced across template 24 twice as fast as the stock pieces are advanced longitudinally with respect to cutters 28. It is readily apparent that for a different ratio of sizes between template 24 and the desired blades to be produced from the stock pieces 20, a different ratio of speeds of advance of the stock piece and template follower and accordingly ratio of gears 150 and 152 is quickly and easily provided.

As may be readily understood, advancement of pushers 38 and 40 under the influence of rotating screws 122 and 124 turning at any speed within the range of .12 r.p.m. to 1.2 r.p.m. is relatively slow. Accordingly, it would be advantageous to minimize the return time of these pushers and to this end provision is made for selectively rotating screws 122 and 124 at speeds considerably greater than the advance speeds hereinabove set forth. For driving screws 122 and 124 in a reverse direction, a second output shaft 200 of motor 132, driven at a relatively constant speed of approximately 1750 r.p.m., is coupled to pulley 156 through a reduction gear box 202, a clutch 204, a shaft 206, a pulley 208 and belt 158. Shaft 206 is journaled in bearings 210 and 212 mounted on lower table 16. In the above mentioned embodiment of this invention, reduction gear box 202 has a reduction ratio of 4.1875:1 whereby shaft 206 is rotatable at a relatively constant speed of 420 r.p.m. Since pulleys 156 and 208 are of the same diameter, shaft 154 when driven by pulley 156 also rotates at an approximate speed of 420 r.p.m. and screw 88 is selectively driven by clutch 154 at the same speed to return template follower 30 in a relatively short period of time. It is also noted that by virtue of the engagement between screw gears 152 and 150 and appropriate sprocket chain drive connections between screws 122 and 124, these screws are driven at speeds of approximately 210 r.p.m. whereby yoke 126 and pushers 38 and 40 are also returned in a relatively short period of time. It is noted that during advancement of yoke 126 and pushers 38 and 40 in a manner hereinabove set forth in considerable detail, shaft 200 of motor 132 is decoupled from shaft 206, pulley 208 and the following drive by clutch 204 and that during return drive of the screws 88, 122 and 124 in the manner hereinabove described, output shaft 186 of reduction gear box 182 is decoupled from shaft 190 and the following drive by clutch 188. In the decoupled condition of clutches 188 and 204, the respective output elements thereof are freely rotatable whereby no interference or retarding influence is imposed upon the reciprocal operation of the screws 88, 122 and 124. It is noted that clutches 147 and 154 are selectively and independently engageable and disengageable by the operator of machine 10 whereby the pushers 38 and 40 and template follower 30 are independently advanceable or returnable as the occasion should require to facilitate alignment in beginning a blade cutting operation. The engagement or disengagement of clutches 188, 204, 147 and 154 is provided by an electrical circuit shown in Fig. 12 of the drawings and described in detail hereinafter.

As hereinabove pointed out, stock pieces 20 while being advanced by pushers 38 and 40 are continuously rotated in chucks 32 by the drive of shaft 46 operating through respective worm gears 42 and 44 and gears 48 and 50. Shaft 46 also provides the rotary drive for template 24 through a helical gear 214 mounted on an end of shaft 46 and in driving engagement with a complementary helical gear 216 rotatable with a shaft 218 journaled in bearings 220 and 222 supported on respective pedestals 224 and 226 on table 14. The end of shaft 218 remote from gear 216 is in driving engagement with template 24.

Shaft 46 is driven by output shaft 160 of motor 132 through a reduction gear box 228, the output shaft 230 of which has a sprocket 232 mounted thereon and in driving engagement with a sprocket 234 rotatable with shaft 46 through a chain 236. Reduction gear box 228 provides a reduction ratio from the input shaft 160 to the output shaft 230 of 60:1 and sprockets 232 and 234 are of different sizes and have numbers of teeth in the ratio of 19:36. Accordingly, in the embodiment of the invention wherein output shaft 160 is driven at speeds in the range of 278 r.p.m. to 1980 r.p.m., shaft 230 and sprocket 232 are driven at speeds in the range of 4.7 r.p.m. to 33 r.p.m., and sprocket 234 and shaft 46 are driven at speeds in the range of 2.48 r.p.m. to 17.5 r.p.m. Since the respective stock pieces 20 are rotated at the same speed as template 24 is rotated, the reduction ratio between worm gear 42 and gear 48, worm gear 44 and gear 50, and between worm gear 214 and gear 216 is the same. Accordingly, the stock pieces and template 24 are rotated in unison as the stock pieces are advanced for machining or cutting.

Template 24 may be removed and replaced by any other suitable template having the shape and contour of any other desired blade and a pedestal 237 mounted on table 14 supports the end of template 24 remote from shaft 218.

According to another feature of this invention, provision is made for lifting template follower 30 away from template 24 and to this end an arm 238 is mounted near the end of shaft 60 and depending between a pair of upright portions 240 and 242 of pedestal 64. Arm 238 is fixedly secured to a shaft 60 whereby the two pivot or rotate in unison in the absence of external influence shaft 60 and therefore also arm 238 is pivoted in accordance with the position of roller 80 on template 24. Template follower 30 may be raised away from engagement with template 24 by a counterclockwise pivotal movement of arm 238 and shaft 60 as seen in Fig. 11. To accomplish this result, a block 244 is movable between upright portions 240 and 242 along a guide shaft 246 secured at respective ends to portions 240 and 242. Block 244 is driven by a screw 248 threadedly engaging the same and being journaled in portions 240 and 242 and rotatable by wheel 250 having a handle 252. Rotation of wheel 250 in one direction is effective to provide engagement between block 244 and arm 248 to force the arm in the counterclockwise direction and a reverse rotation of the wheel is effective to remove the block from such engagement to allow follower 30 to follow the contour of template 24 in a normal manner. To condition follower 80 for following template 24, block 244 is retracted as shown in Fig. 11 to allow a full swing of arm 238.

Figure 12:
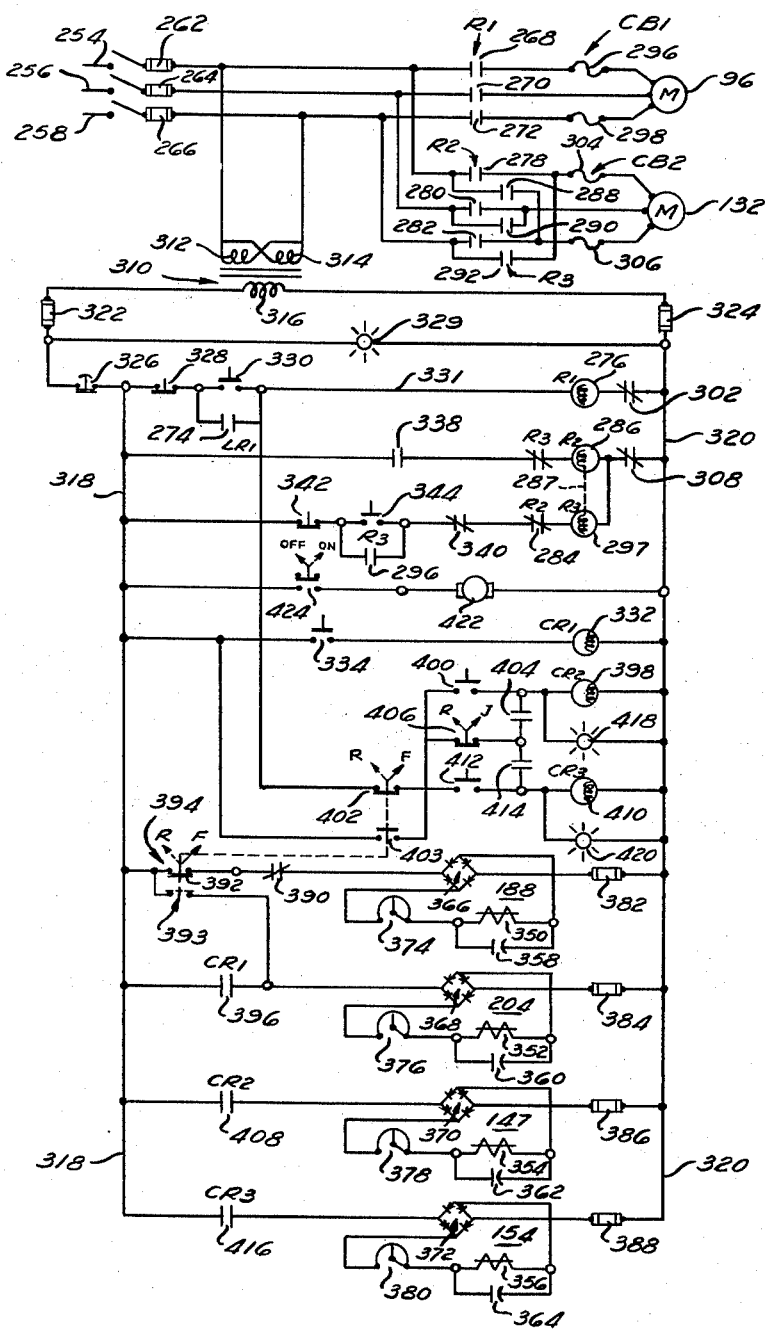
Fig. 12 is an electrical wiring diagram showing electrical components and connections for operating the various elements of the invention.

The energization and de-energization of the various motors and clutches of the herein disclosed apparatus is accomplished by the electrical circuit shown in Fig. 12 of the drawings. In the following description of this circuit, reference is made to normally closed and normally open contacts of either relays or manually operable switches to indicate in respective instances, that during the de-energized condition of corresponding relay coils for actuating the contact, the contact is open or closed as the case may be and that in the absence of manual actuation, the switch is open or closed as the case may be.

In Fig. 12 of the drawings, 254, 256 and 258 represent input lines of a three-phase power system providing electrical energy under the control of a master disconnect switch 260 and through respective line fuses 262, 264 and 266. Cutter motor 96 receives electrical energy from these lines through a relay R1 having normally open line contacts 268, 270, 272 for connecting the line to the motor 96 and a normally open switch bypassing contact 274, all of which are controlled by a coil 276. Chuck motor 132 receives electrical energy through either a reverse relay R2 having normally open contacts 278, 280 and 282 for connecting the line to the motor 132 and a normally closed auxiliary contact 284, all of which are controlled by a coil represented at 286, or through a forward relay R3 having normally open contacts 288, 290 and 292, a normally closed auxiliary contact 294, and a normally open switch bypassing contact 296 controlled by a coil 297. Relays R2 and R3 are preferably a combined unit enclosed in a single housing as indicated by the dotted line 287. It is observed that by the closure of relay R2 one of the phases of the three-phase system supplying energy to motor 132 is reversed with respect to the closure of relay R3 whereby the rotation of the motor thereof is also reversed.

An overload circuit breaker CB1 having coils 298 and 300 interposed in a pair of lines to motor 96 is provided with a normally closed contact 302 in the circuit of relay coil 276 more fully described hereinbelow whereby the tripping of contacts 302 is effective to de-energize coil 286 and interrupt energization of motor 96 in response to excessive motor current. Similarly an overload circuit breaker CB2 having coils 304 and 306 interposed in a pair of lines to motor 132 is provided with a normally closed contact 308 in the circuit of relay coils 286 and 297, more fully described hereinbelow, to de-energize these coils and interrupt the energization of motor 132 in response to excessive motor current.

For controlling energization of motors 96 and 132, coils 276, 286 and 297 of relays R1, R2 and R3 receive electrical energy from the main power line through a transformer 310 having primary windings 312 and 314 connected in parallel across one phase of the input power line and a secondary winding 316 for energizing a pair of control lines 318 and 320 through a pair of control fuses 322 and 324 and an emergency stop contact 326. A suitable pilot light 329 is connected across the control lines 318 and 320 for indicating the energization thereof through transformer 310. It is noted that emergency stop contact 326 is normally closed and that opening thereof is effective to interrupt the application of electrical energy to lines 318 and 320 and therefore to the control circuit hereinbelow described and accordingly to interrupt application of electrical energy to coils 276, 286 and 297 to stop motors 96 and 132.

Coil 276 is connected across the control lines 318 and 320 in series with a normally closed cutter motor stop contact 328, a normally open cutter motor start contact switch 330, a line connection 331, and normally closed overload circuit breaker contact 302. Closure of cutter motor start contact 330 is effective to energize solenoid coil 276 which in turn is effective to close the contacts of relay R1 including contacts 274 connected across cutter motor start contact 330. Accordingly, relay coil 276 and motor 96 continue to be energized even after the cutter motor start contact 330 is manually released.

For effecting reverse operation of motor 132, a first control relay CR1 is provided with a solenoid coil 332 connected across lines 318 and 320 through a rapid forward contact switch 334. A first pair of normally open contacts 338 of control relay CR1 are serially connected with contacts 294 of relay R3, a coil 286 of relay R2 and normally closed contacts 308 of overload circuit breaker CB2 across lines 318 and 320. A second pair of normally closed contacts 340 of control relay CR1 are serially connected with a normally closed chuck motor stop contact switch 342, a normally open chuck motor start switch 344, normally closed contacts 284 of relay R2, coil 297 of relay R3 and normally closed contacts 308 of overload circuit breaker CB2. A third pair of contacts 345 of control relay CR1 are interposed in the electrical circuit of clutch 204 described hereinbelow. Chuck motor start contact switch 344 is bypassed by contacts 296 of relay R3 when coil 297 is energized whereby release of switch 344, of itself, is ineffective to de-energize the coil.

From the foregoing it is observed that energization of coil 276 by the manual closure of switch 330 is effective to close line contacts 268, 270 and 272 to start cutter motor 96 and that chuck motor 132 is started for forward rotation by a manual closure of switch 344 whereby relay coil 297 is energized for closing forward line contacts 288, 290 and 292. Reverse rotation of chuck motor 132 is effected by closure of switch 334 for energizing coil 332 of relay CR1 whereby contacts 338 of relay CR1 are closed for energizing coil 286 of relay R2 and contacts 340 of relay CR1 are opened for simultaneously de-energizing coil 297 of relay R3.

The electrical circuits of clutches 188, 204, 147 and 154 comprise a portion of the control circuit of Fig. 12 and these circuits include respective clutch coils 350, 352, 354 and 356 being shunted by respective capacitors 358, 360, 362 and 364. Each clutch coil is responsive to electrical energization to produce a magnetic coupling between input and output clutch members in a manner well known.

The respective coils 350, 352, 354 and 356 of the clutches are energized from lines 318 and 320 through contacts of relay CR1 and relays described hereinbelow and respective bridge rectifiers 366, 368, 370 and 372 serially connected with respective current controlling rheostats 374, 376, 378 and 380. Respective fuses 382, 384, 386 and 388 are provided for protecting the clutch circuits.

The control circuit for clutch 188 includes a pair of normally closed contacts 390 of relay CR1 serially connected with a pair of contacts 392 of a reversing switch 394. A pair of normally open contacts 396 of control relay CR1 are serially connected with the circuitry of clutch 204 for controlling energization of the same. In the forward position of switch 394, coil 350 of clutch 188 is energized to engage the clutch in the absence of energization of relay CR1 and energization of control relay CR1 effects energization of coil 352 to effect engagement of clutch 204 and disengagement of clutch 188, while in the reverse position of switch 394, coil 350 of clutch 188 is de-energized by open contacts to disengage the same and coil 352 of clutch 204 is energized to engage the clutch 204 irrespective of energization of relay CR1. In a reverse position of switch 394, clutch coil 350 is energized through contacts 393 of switch 394.

A second control relay CR2 having a coil 398 in series with a normally open stock feed start switch 400 having one terminal thereof connected to one contact of sets of contacts 402 and 403 of reversing switch 394, the other contacts of which sets are connected respectively to lines 318 and 331, is effective to actuate normally open bypassing contacts 404 for bypassing start switch 400 through a run-jog switch 406 when the same is in "run" position, and for actuating a pair of contacts 408 in series with the circuit of clutch 147 across lines 318 and 320. Accordingly, actuation of relay CR2 by the closure of switch 400 is effective to engage stock feed clutch 147 for driving screws 122 and 124 to actuate the pushers 38 and 40.

A third control relay CR3 having a coil 410 is energizable through a normally open follower feed start switch 412 and either of sets of contacts 402 or 403 of reversing switch 394. Energization of coil 410 effects closure of normally open contacts 414 to bypass switch 412 through run-jog switch 406 when the same is in "run" position and maintain coil 410 energized without continued closure of switch 412. A further pair of normally open contacts 416 in series with the clutch circuit of clutch 154 are actuable by coil 410 to provide energization of coil 356 for engagement of clutch 154.

Suitable pilot lights 418 and 420 may be applied across coils 398 and 410, respectively, to indicate energization of the coils and a coolant pump motor 422 may be connected across lines 318 and 320 in series with a switch 424 for circulating a suitable coolant applicable to the stock pieces 20 during cutting.

For an understanding of the operation of present invention under the control of the circuit of Fig. 12, it is assumed that stock pieces 20 have been mounted in chucks 48 and 50, that template 24 has been appropriately mounted, that block 244 is fully retracted, and that pushers 38 and 40 and follower 30 are appropriately at their respective initial positions as shown in Fig. 1 of the drawings. All relays and manually operable switches are in their respective normal positions, and switch 406 is in "jog" position. Master disconnect switch 260 is then closed to energize lines 318 and 320. Cutter motor start switch 330 is closed to energize coil 276, closing contacts 268, 270, 272 and 274 energizing cutter motor 96 and retaining coil 276 energized through contacts 274. Chuck motor 132 is also energized by the closure of switch 344 energizing coil 297 whereby contacts 296 of relay R3 are closed to bypass normally open switch 344 and forward contacts 288, 290 and 292 of relay R3 are closed to energize motor 132. After providing appropriate coolant flow by motor 422, advancement of pushers 38 and 40 is provided by closure of stock feed start switch 400 which effects energization of coil 398 of control relay CR2 from line 331 through contacts 402 of switch 394. Assuming that "run-jog" switch 406 is in the "run" position, closure of contacts 404 of control relay CR2 retains coil 398 energized. Energization of coil 398 effects closure of contacts 408 in the circuit of clutch 147 whereby clutch 147 is engaged by the energization of coil 354. Since clutch 188 is also engaged by the energization of coil 350 through contacts 392 of switch 394 and normally closed contacts 390 of control relay CR1, screws 122 and 124 are driven by motor 132 through reduction gear boxes 170 and 182, the clutches 188 and 147 and various of the described shafts, sprockets and chains. Stock pieces 20 are advanced as hereinabove described and to position cutters 28 relative to the stock pieces in accordance with template 24, simultaneous with the closure of switch 400 follower feed start switch 412 is closed to energize coil 410 of contact relay CR3 whereby normally open contacts 416 thereof are closed to energize clutch coil 356, effecting engagement of clutch 154. Accordingly, screw 88 is driven through a drive including elements hereinabove described to advance follower 30. At this stage the machine operates continuously to cut the stock pieces 20 along their lengths as follower 30 advances along template 24. Suitable limit switches may be provided to interrupt the advancement of the pushers 38 and 40 at the end of their stroke to prevent damage to the stock pieces or machine.

It is noted that further provision is made for advancing either the stock pieces or follower 30 completely under manual control. That is, advancement continues only while stock feed start switch 400 or follower feed switch 412 is closed. To this end, run-jog switch 406 is placed in "jog" position whereby energization of relay occurs only through start switch 400 since closure of relay contacts 404 of relay CR2 is ineffective to provide a bypass for the switch 400. It is observed that this feature facilitates alignment of the follower 30 and cutters to appropriate starting positions since the same are independently movable relative to the other.

It is further noted that subsequent to automatic operation of the machine with switch 406 in "run" position, this switch serves as a simultaneous stop switch for both follower 30 and pushers 38 and 40 since opening of switch 406 interrupts current flow to each of coils 398 and 410 of relays CR2 and CR3 to disengage clutches 147 and 154 in the drive of screws 122, 124 and 88.

As hereinabove explained, during cutting of stock pieces 20, follower 30 and stock pieces 20 are slowly advanced. At the end of the cutting operation it becomes necessary to return the pushers 38 and 40 and the follower 30 to their respective initial positions and it is advantageous to return the same at a rate considerably faster than their respective advance rates. For reverse operation of screws 122, 124 and 88, switch 394 is placed in "reverse" position effecting energization of clutch coil 352 of clutch 204 and de-energizing clutch coil 350 of clutch 188, and chuck motor 132 is operated as herein described. As observed in Fig. 1, under these circumstances screws 122, 124 and 88 are driven by gears 150 and 152 through pulleys 156 and 208 and belt 158 and other components including clutches 147 and 154 which are engaged for reverse operation in a manner entirely similar to forward operation already described. By reason of the ratios of gear box 202 and gears 150 and 152 in the drive between motor 132 and the screws 122, 124 and 88, the latter are rotated at relatively high speed to return the pushers 38 and 40 and follower 30 to initial position. For advancing either the pushers 38 and 40 or template follower 30, motor 132 is operated in a reverse direction and clutches 204, 147 and 154 are engaged as hereinabove described.

It is noted that according to the control circuit described, precaution is taken to have cutters 28 rotating before stock pieces 20 are advanced since energization of coils 398 and 410 during forward operation requires the closure of cutter motor switch 330 or contacts 274 of relay R1 whereby coil 276 is energized.

It is readily understood that suitable limit switches disposed at respective ends of the travel of both pushers 38 and 40 and follower 30 may be provided to interrupt the drive at such points to prevent damage to the pieces 20 or any of the parts of machine 10. However, since these form no part of the invention herein the same are neither shown nor described in detail.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

We claim:

1. In a machine for cutting blades from pieces of stock in accordance with the surface contour of a template comprising a pair of chucks for mounting said stock pieces and means for continuously revolving said chucks and template in unison, a pair of pushers mounted coaxially with said chucks for advancing the stockpieces through the chucks, means for moving said pushers relative to respective chucks, a pair of rotary cutters pivotal about an axis parallel to the rotary axes thereof into alignment with the respective axes of said chucks, a follower having a pivotal arm engageable at one end with said template and pivotal at the other end, means coupling said cutters to said follower arm for unitary pivotal movement and means for advancing said follower longitudinally along said template at a rate proportional to the rate of advance of said pushers whereby said cutters engage and cut said stock pieces along the length thereof and about the periphery thereof in accordance with the surface contour of said template along its length and about its periphery.

2. In a machine for cutting blades from pieces of stock in accordance with the surface contour of a template comprising a pair of chucks for mounting said stock pieces and means for continuously revolving said chucks and template in unison about respective axes thereof, a pair of pushers mounted co-axially with said chucks for advancing the stockpieces through the chucks, means for moving said pushers relative to said respective chucks at a predetermined rate and including a lead screw threadedly engaging a portion of said pushers, a pair of rotary cutters supported by a means pivotal about an axis parallel to the rotary axes of said cutters, a shaft pivotally supporting said rotary cutters, a follower having a pivotal arm engageable at one end with said template and being pivotal at said other end about said shaft and in driving engagement therewith, means including a second lead screw for advancing said follower along said template at a rate proportional to the rate of advance of said pusher, power means for rotating said chucks and template and for rotating said lead screws, clutch means interposed in the drive of said lead screws and means for selectively engaging said clutch means to independently advance said pushers and said follower.

3. In a machine for cutting blades according to claim 2, further comprising power means for driving said lead screws in reverse directions to retract said pushers and follower, clutch means interposed in said drive, and means for selectively engaging said last mentioned clutch means whereby said template and pushers are retractable at a rate greatly in excess of the respective rates of advance thereof.

4. In a machine for cutting blades from pieces of stock material in accordance with a blade template similar in surface contour to that of a desired blade, means for gripping and retaining said stock pieces against lateral movement, means for continuously revolving said blade and template in unison, cutter means engageable with said stock pieces and disposed adjacent to said gripping means, follower means engageable with said template for positioning said cutter means transversely relative to said stock pieces, means for advancing portions of said stock pieces toward and past said cutters and means for advancing said follower relative to said template at a speed proportionate to the advancement of said stock piece advancing means.

5. In a machine for cutting a blade from a piece of stock material in accordance with a blade template similar in over-all contour to that of a desired blade, means for gripping and restraining said stock piece from lateral movement, means for continuously revolving said blade and template in unison, cutter means engageable with said stock piece and disposed adjacent said gripping means, means supporting said cutter means and follower means integral with said cutter means and engageable with said template for positioning said cutter means transversely relative to said stock pieces, means for advancing portions of said stock pieces toward and past said cutters and means for advancing said follower relative to said template at a speed proportionate to the advancement of said stock piece advancing means.

6. In a machine for cutting blades from pieces of stock material in accordance with a blade template similar in over-all surface contour to that of a desired blade, means for gripping and retaining said stock pieces against lateral movement, means for continuously revolving said blade and template in unison, yoke means pivotal about an axis and cutter means supported by said yoke means at a point removed from said axis and being disposed adjacent to said gripping means, follower means integral with said cutter means and engageable with said template for positioning said cutter means transversely relative to said stock pieces, means for advancing portions of said stock pieces toward and past said cutters and means for advancing said follower relative to said template at a speed proportionate to the advancement of said stock piece advancing means.

7. In a machine for cutting blades from pieces of stock material in accordance with a blade template similar in over-all surface contour to that of a desired blade, means for gripping and retaining said stock pieces against lateral movement, means for continuously revolving said blade and template in unison, yoke means pivotal about an axis and cutter means supported by said yoke means at a point removed from said axis and being disposed adjacent to said gripping means, follower means integral with said cutter means and engageable with said template for positioning said cutter means transversely relative to said stock pieces, said follower being pivotal about said axis, means for advancing portions of said stock pieces toward and past said cutters and means for advancing said follower relative to said template at a speed proportionate to the advancement of said stock piece advancing means.

8. In a machine for cutting blades from stock material in accordance with a blade template similar in over-all surface contour to that of a desired blade, chuck means for slideably holding said stock for longitudinal movement while restraining the stock against lateral movement in any direction relative to the center line, means for continuously revolving said stock and template in timed relation, yoke means pivotal about an axis parallel to the axis of rotation of said stock, cutter means supported by said yoke means at a point removed from said axis and being disposed adjacent to said chuck, follower means integral with the yoke means engageable with said template for positioning said yoke means and said cutter means transversely relative to the center line of said stock, said follower being pivotal about said axis, pusher means for advancing said stock through said chuck toward and past said cutters, and means for advancing said follower relative to said template at a speed relative to the speed of advancement of said stock.

9. In a machine for cutting blades from stock material in accordance with a blade template similar in over-all surface contour to that of a desired blade, chuck means for slideably holding said stock for longitudinal movement while restraining the stock against lateral movement in any direction relative to the center line, means for continuously revolving said stock and template in timed relation, yoke means pivotal about an axis parallel to the axis of rotation of said stock, cutter means supported by said yoke means at a point removed from said axis and being disposed adjacent to said chuck, follower means integral with the yoke means engageable with said template for positioning said yoke means and said cutter means transversely relative to the center line of said stock, said follower being pivotal about said axis, pusher means for advancing said stock through said chuck toward and past said cutters, and a means for advancing said follower relative to said template at a speed relative to the speed of advancement of said stock which bears the same ratio as the length of the template to the length of the finished blade.

10. In a machine for cutting blades from stock material in accordance with a blade template similar in over-all surface contour to that of a desired blade, a chuck for slideably holding said stock for longitudinal movement while restraining the stock against lateral movement in any direction relative to the center line, means for continuously revolving said chuck and template in timed relation, yoke means pivotal about an axis parallel to the axis of rotation of said chuck, cutter means supported by said yoke means at a point removed from said axis and being disposed adjacent to said chuck, follower means integral with the yoke means engageable with said template for positioning said yoke means and said cutter means transversely relative to the center line of said stock, said follower being pivotal about said axis, pusher means for advancing said stock through said chuck toward and past said cutters, and means for advancing said follower relative to said template at a speed relative to the speed of advancement of said stock.

References Cited in the file of this patent

UNITED STATES PATENTS

| | | |
|---|---|---|
| 2,113,716 | Berliner | Apr. 12, 1938 |
| 2,753,764 | Stephenson | July 10, 1956 |

FOREIGN PATENTS

| | | |
|---|---|---|
| 833,624 | Germany | Sept. 22, 1955 |